March 17, 1925.

B. O. AUSTIN

MOTOR CONTROL SYSTEM

Filed Nov. 5, 1920    2 Sheets-Sheet 1

1,529,761

WITNESSES:
H. T. Shelhamer
H. C. Lowe

INVENTOR
Bascum O. Austin
BY
Wesley G. Carr
ATTORNEY

March 17, 1925.
B. O. AUSTIN
1,529,761
MOTOR CONTROL SYSTEM
Filed Nov. 5, 1920   2 Sheets-Sheet 2
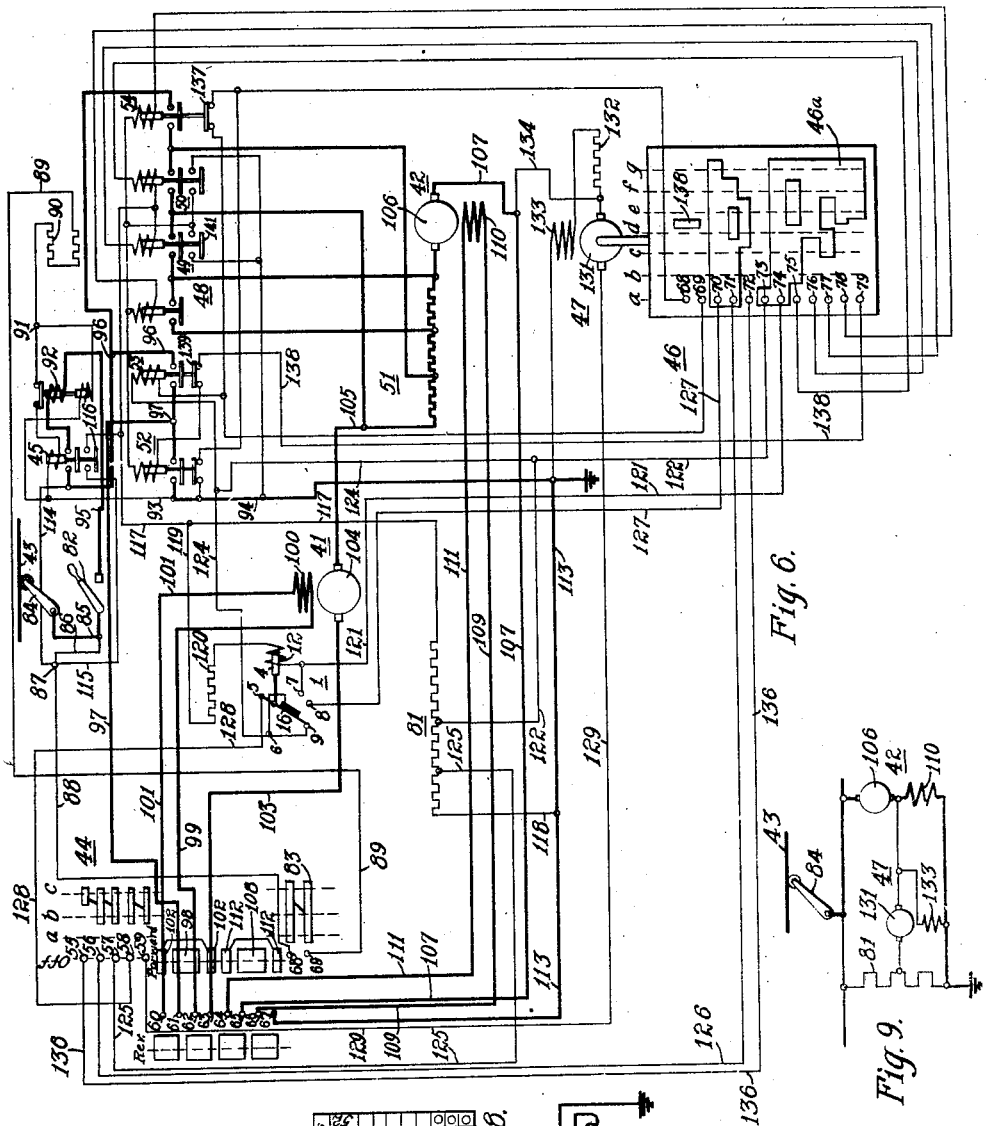
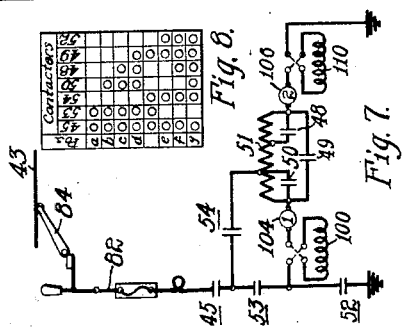
WITNESSES:
H. J. Shelhamer
H. C. Lowe
INVENTOR
Bascum O. Austin
BY
Wesley G. Carr
ATTORNEY Patented Mar. 17, 1925.

1,529,761

UNITED STATES PATENT OFFICE.

BASCUM O. AUSTIN, OF WILKINSBURG, PENNSYLVANIA, ASSIGNOR TO WESTINGHOUSE ELECTRIC & MANUFACTURING COMPANY, A CORPORATION OF PENNSYLVANIA.

MOTOR-CONTROL SYSTEM.

Application filed November 5, 1920. Serial No. 421,900.

*To all whom it may concern:*

Be it known that I, BASCUM O. AUSTIN, a citizen of the United States, and a resident of Wilkinsburg, in the county of Allegheny and State of Pennsylvania, have invented a new and useful Improvement in Motor-Control Systems, of which the following is a specification.

My invention relates to motor-control systems, and it has particular relation to control systems employed for operating motors of electric cars and locomotives.

One object of my invention is to provide a relay device that is capable of establishing a relatively large number of circuits although employing only a relatively few contact members.

Another object of my invention is to effect the control of the operating of an auxiliary motor which operates a control device in accordance with the load upon the main motors.

A third object of my invention is to provide a system of control which will prevent the opening of certain of the contactors embodied therein before the opening of a line switch, thereby lessening the wear upon the contactors.

Heretofore, contactors have been controlled by the master controller and, upon the master controller being actuated to its "off" position, many of the contactors have opened before the circuit breaker.

By employing a system of control arranged in accordance with my invention, the contactors, with the exception of the line switch or circuit breaker, may be made smaller and may be placed within the interior of the car.

For a better understanding of my invention, reference may be made to the accompanying drawings—

Figure 1 of which is a view, partly in plan elevation and partly in section, of a relay device embodying my invention.

Fig. 6 is a diagrammatic view of a motor control system embodying my invention.

Fig. 7 is a schematic view of the main circuits illustrated in Fig. 6.

Fig. 8 is a sequence chart, showing the order in which the main contactors close in the control system shown in Fig. 6.

Fig. 9 is a schematic view of a portion of the control system shown in Fig. 6.

Figure 1:
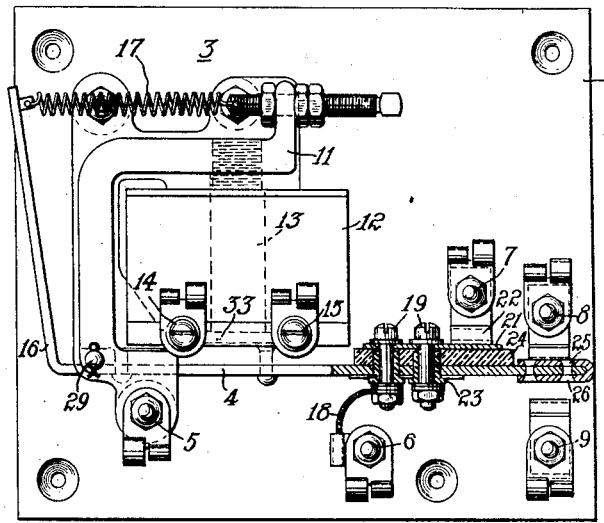
Figure 2:
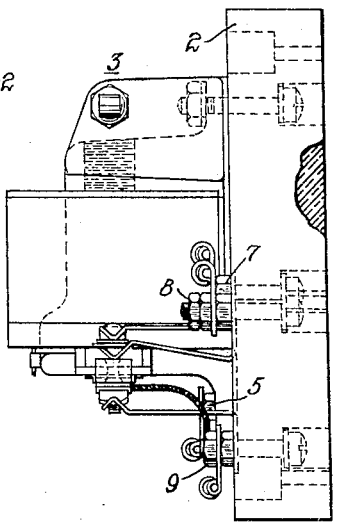
Fig. 2 is a view, in end elevation, of the relay device shown in Fig. 1.

Referring particularly to Figs. 1 and 2, a relay device 1 comprises a base member 2 of suitable insulating material, such, for example, as slate, on which is mounted a magnetizable member 3, an armature 4, and a plurality of contactors 5, 6, 7, 8 and 9.

The magnetizable member 3 comprises an irregular shaped core member 11, on which a solenoid 12 is mounted by means of a threaded cylindrical member 13. The solenoid 12 comprises a winding which is electrically connected to terminals 14 and 15. The armature member 4 is pivotally mounted upon the end of an arm 16 of substantially L-shape which is biased to its open position by means of a spring, or other resilient member 17, which is attached thereto and to the casting 11.

The arm 16 is adapted to connect the contact terminal 5 to the contact terminal 8 upon the armature 4 being actuated to its closed position, and to connect the contact terminal 5 to the contact terminal 9 upon the armature 4 assuming its open position.

The contact terminal 6 is electrically connected to the contact terminal 7, when the armature 4 is in its closed position, this connection comprising an electrical conductor 18, bolts, 19, a plate member 21, stationary contact member 22 of contact terminal 7.

The bolts 19 are insulated from the arm 16 by tubes of suitable insulating material 23 and a flat insulating member 24. The arm 16 is provided with two contact members 25 and 26 which are electrically connected to the arm 16.

Figure 3:
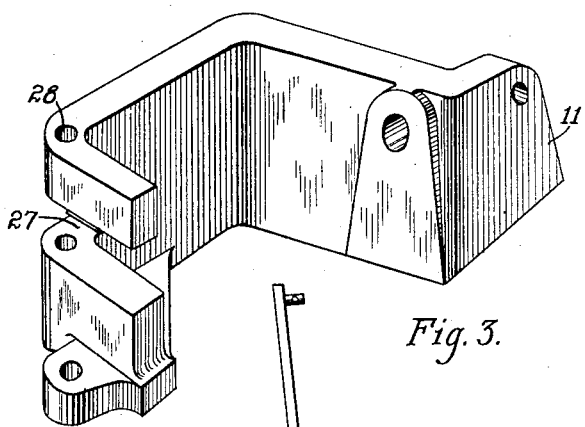
Fig. 3 is an enlarged view, in perspective, of one part of the apparatus shown in Fig. 1.

Referring to Fig. 3, the irregular-shaped casting 11 is provided at one end with a slot 27 in which the arm 16 is relatively free to move, and with holes 28 through which a pin 29 extends to position the arm 16.

Figure 4:
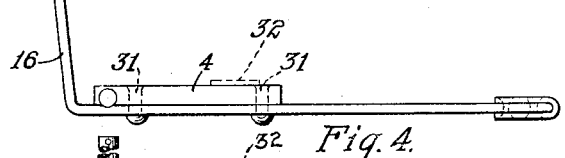
Figs. 4 and 5 are views, in plan and side elevation, respectively, of an armature member shown in Fig. 1.
Figure 5:
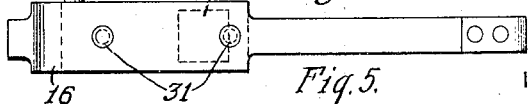

Referring particularly to Figs. 4 and 5, the armature 4 is secured to the arm 16 by means of rivets 31. A brass plate 32, forming part of the armature 4, prevents the armature from adhering to the magnetizable member 33 after it has been de-energized.

Referring to the control system shown in Figs. 6 and 7, motors 41 and 42 are energized from a trolley 43 through a circuit comprising a master controller 44 and a line switch or circuit breaker 45.

A control device 46 is actuated by an auxiliary motor 47. Contactors 48, 49 and 50 are provided for shunting a starting resistor 51, thereby accelerating motors 41 and 42. Contactors 52, 53 and 54 are provided for changing the motors 41 and 42 from series to parallel connection.

The master switch 44 comprises a plurality of movable contact segments and a plurality of stationary contact terminals 55 to 69, inclusive. The control device 46 comprises a plurality of movable contact segments and a plurality of stationary contact terminals 68 to 79, inclusive. A resistor 81, by means of which the accelerating contactors 48, 49 and 50 and the series-parallel contactors 52, 53 and 54 are energized, is electrically connected between the trolley 43 and ground by means of the circuit breaker 45.

The operation of the motor control system is begun by effecting the engagement of the reversing contact segments of the master controller 44 with the contact terminals 60 to 69, inclusive, to effect forward operation of the motors 41 and 42. A manually operable switch 82 is closed and the master controller 44 is actuated to position "a", thereby establishing a circuit through the trolley pole 84, conductors 85 and 86, two-circuit snap switch 87, conductor 88, contact terminal 68 and 69, contact segment 83, conductor 89, resistor 90, conductor 91, contact member of the overload relay 92, the actuating coil of the circuit breaker 45 and conductors 93 and 94 to ground.

When the circuit breaker 45 is closed, a circuit is established from the trolley through the pole 84, conductor 85, knifeblade switch 82, conductor 95, actuating coil of overload relay 92, contact member of circuit breaker 45, conductor 96, contact member of contactor 53, conductor 97, contact terminals 61 and 62 of master controller 44, contact segment 98, conductor 99, series field magnet winding 100, conductor 101, contact terminals 60 and 63, contact segment 102, conductor 103, armature 104 of motor 41, conductor 105, starting resistor 51, armature 106 of motor 42, conductor 107, contact terminal 65 and 66, contact segment 108, conductor 109, series field magnet winding 110 of motor 42, conductor 111, contact terminals 64 and 67, contact segment 112, and conductors 113 and 94 to ground.

The motors 41 and 42 begin to operate at a relatively low speed, as they are connected in series and all of the starting resistor is in circuit with them. The next steps are the gradual shunting of the starting resistor 51 by means of the accelerating contactors 50, 48 and 49 in the order named.

The actuating coils of the contactors 50, 48 and 49 are energized by circuits comprising the control resistor 81. As soon as the line switch 45 is closed, a circuit is established through the control resistor 81 to ground, by an auxiliary circuit beginning at conductor 96, which is at the ground side of the line switch 45, through conductor 114, two-circuit snap switch 87, conductor 115, auxiliary contact member 116 of circuit breaker 45, conductor 117, control resistor 81, and conductors 118, 113 and 94 to ground.

This circuit can only be de-energized by opening the line switch 45 and all contactors that are energized therefrom will not open when the master controller 44 is actuated to its "off" position until after the line switch 45 is opened. This is the means for effecting one of the objects of my invention, for, by opening the line switch or circuit breaker 45 before opening the contactors 48, 49, 50, 52, 53 and 54, arcs occur only at the circuit breaker.

Another circuit, which is also established after the line switch 45 is closed, extends from conductor 117 through conductor 119, resistor 120, solenoid 12 of the relay 1, conductor 121, contact terminals 74 and 73 of drum controller 46, and conductor 122 to a point on control resistor 81.

When the arm 16 of the relay 1 assumes its closed position, a holding circuit for the relay 1 is established from conductor 117 through resistor 120, solenoid 12, contact terminals 7 and 6, conductor 124 and 122 to a point on the control resistor 81.

When the master controller 44 is actuated to its position b, a circuit is established from control resistor 81 through conductor 125, contact terminals 57 and 56, conductor 126, contact terminals 71 and 70 of drum controller 46, conductor 127, contact terminals 8 and 5 of the relay 1, conductor 128, contact terminals 58 and 59, conductor 129, armature 131 of motor 47, resistor 132, field magnet winding 133 to ground.

A second circuit is established through field magnet winding 133 of the auxiliary motor 47 from conductor 107, which is between the armature 106 and the field magnet winding 110 of the motor 42 through conductor 134, resistor 132, and field magnet winding 133 to ground.

For a better understanding of the operation of the auxiliary motor 47 reference may be made to Fig. 9. The motor 42 has an armature 106 and a series field-magnet winding 110 and the auxiliary motor 47 has an armature 131 and a shunt field-magnet winding 133. The control resistor 81 is connected between the trolley 43 and ground.

When there is a light load upon the motor 42, there is only a small drop in potential through the series field-magnet winding 110 thereof and, as one terminal of the field-magnet winding 110 is connected directly to ground, there is but slight difference in potential between conductor 134 and ground.

The auxiliary motor 47 being energized by the difference in potential between a point on the control resistor 81, where the conductor 125 is attached thereto, and ground, the voltage across the armature 131 and the field-magnet winding 133 of the auxiliary motor 47 will remain substantially constant, unless varied because of a change in the difference of potential between the conductor 134 and ground as hereinafter set forth.

When there is a heavy load on the motor 42, there is a greater drop in potential across the field magnet winding 110 thereof, and, consequently, there will be a greater difference in potential between conductor 134 and ground. This increased potential increases the energization of the field-magnet winding 133 of the auxiliary motor 47, thereby reducing its speed.

The voltage across the armature 131 of the auxiliary motor 47 is also changed but inversely to that of the field magnet winding 133, for as the voltage of the conductor 134 increases in potential the difference in voltage between it and the conductor 129 decreases, thereby further decreasing the speed of the auxiliary motor 47.

It is apparent, from the above description, that the effect of connecting some point between the armature 131 and the field-magnet winding 133 of the motor 47 to a point between the armature 106 of the motor 42 and the field-magnet winding 110 is to vary both the value of the current through the armature 131 and the voltage across the field-magnet winding 133 of the motor 47.

If the motors are operating under a heavy load, the motor 47 will operate very slowly to move the drum controller 46, thereby shunting the resistor 51 gradually from the circuit comprising the motors 41 and 42.

The operation of the auxiliary controller 46 causes accelerating contactors 50 to close first, as the contact terminal 75 is connected to terminal 74 of the drum controller 46 by means of the irregular-shaped contact segment 46a.

Contact terminal 77 being next engaged by the contact segment, contactor 48 is closed, shunting a second portion of the starting resistor 51. The contact terminal 76 being engaged by the contact segment 46a, when the auxiliary motor 47 has actuated the drum 46 to position $d$, the actuating coil of the accelerating contactor 49 is closed, thereby completely shunting the starting resistor 51. The motors are now operating in series without any portion of the resistor 51 being in circuit with them.

Unless the master controller 44 is actuated to its position $c$, this connection will continue, for the circuit comprising the contact terminal 70 and 71 is broken, when drum controller 46 is in positions $d$ and $e$. When the master controller 44 is brought to full running position $c$, contact terminal 55 is electrically connected to the positively energized contactor 57. A circuit is established from contact terminal 57 through contact terminal 55 of the master controller 44, conductor 136, contact terminal 72 and 70 so long as drum controller 47 is in position $d$ and $e$, conductor 127, contact terminals 8 and 5 of the relay 1, conductor 128, contact terminals 58 and 59 of master controller 44, conductor 129, armature 131 of the auxiliary motor 47, resistor 132, and field magnet winding 133 of the motor 47.

The pilot or auxiliary motor 47, being energized, continues to operate the drum controller 46 from position $d$ to position $g$.

When the auxiliary controller 46 is in position $e$ contact terminals 75 and 77 are disconnected from the terminal 74, thereby deenergizing the actuating coils of the accelerating contactors 48 and 50, respectively, permitting them to open.

The accelerating contactor 49 will remain closed as the contact terminal 76 is electrically connected with the conductor 74 throughout the remainder of the drum controller's travel.

The actuating coil of the contactor 54 is energized when the contact terminals 74 and 78 are electrically connected by the contact segment of the controller 46, when it is brought to a position slightly in advance of position $e$. When contactor 54 is closed, a circuit comprising the actuating coil of the contactor 53 is broken, as the circuit comprises the auxiliary contact member 137 of contactor 54. However, a second circuit through the contact segment 138 of the drum controller 46 is established which momentarily bridges the contact terminals 68 and 69, thereby energizing the actuating coil of the contactor 53 until contactor 54 is closed.

When the drum controller 46 occupies position $e$, the actuating coil of the contactor 53 is de-energized and the contactor 53 opens. Contactor 52 assumes its closed position when the drum controller 46 is in position $e$, by the contact terminals 74 and 79 being electrically connected, thereby establishing a circuit from contact terminal 74 to contact terminal 79, conductor 138, auxiliary contact member 139 of contactor 53, actuating coil of contactor 52, conductor 139, and auxiliary contactor 141 of the accelerating contactor 49 to ground.

When the contact terminals 74 and 77 are electrically connected by the auxiliary controller 46 being actuated to position *f*, the actuating coil of the contactor 48 is closed, thereby shunting a portion of the starting resistor 59.

The contactor 50 closes, when the contact terminal 75 is electrically connected with the contact terminal 74, upon the drum controller 46 being brought to position *g*.

The motors 41 and 42 being connected in parallel and the starting resistor 51 being shunted, the motors are now operating at full speed.

While I have shown my invention in its preferred form it is is apparent that minor modifications may be made in arrangement of circuits and apparatus without departing from the spirit thereof. I desire, therefore, to be limited only to the scope of the appended claims.

I claim as my invention:

1. In a motor control system, the combination with a motor and a source of electrical energy, of means for connecting said motor to said source, a plurality of contactors for controlling the operation of said motor, a master controller for controlling said contactors, and means for preventing the opening of said contactors that are closed upon said master controller being actuated to its inoperative position before disconnecting said motor from said source.

2. In a control system, the combination with a dynamo-electric machine, and a source of energy, of a circuit breaker for connecting said machine to said source, a master controller, a control resistor, said resistor being energized upon said circuit breaker being closed and remaining energized independent of the position of said master controller so long as said circuit breaker is closed, a plurality of contactors having actuating coils, and means for connecting said coils to said resistor.

3. In a motor control system, the combination with a source of energy, dynamo-electric machine and a master controller, of a line switch operated by said master controller for connecting said machine to said source, a resistor connected to said supply source by said line switch, a plurality of contactors for operating said motor, an auxiliary controller for operating said contactors, an auxiliary motor for operating said auxiliary controller, the operation of said motor being controlled by said master controller, said auxiliary controller connecting said contactors to said resistor.

4. In a motor control system, the combination with a dynamo-electric machine, a master controller and an auxiliary controller, of a plurality of contactors controlled by said auxiliary controller, a circuit breaker for energizing said dynamo-electric machine, means for so connnecting said contactors to said auxiliary controller that said contactors remain closed upon said master controller being actuated to its inoperative position until after said circuit breaker opens.

5. The combination with a main motor and a plurality of contactors having actuating coils for operating said main motor, of a master controller, a circuit breaker controlled by said master controller for energizing said main motor, an auxiliary controller for controlling said contactors, means independent of said master controller, for maintaining the actuating coils of said contactors energized until said circuit breaker is opened, an auxiliary motor having an armature and a field-magnet winding for operating said auxiliary controller, the operation of said auxiliary controller being dependent upon the position of said master controller and the load upon said main motor.

6. The combination with a main motor having an armature and a field-magnet winding and a plurality of contactors having actuating coils for operating said main motor, of a master controller, a circuit breaker controlled by said master controller for energizing said main motor, a drum controller for controlling said contactors, a resistor, said resistor being energized so long as said circuit breaker is in its closed position regardless of the position of said master controller, an auxiliary motor having an armature and a field-magnet winding for operating said auxiliary controller, means comprising a relay for connecting the armature of said auxiliary motor to said resistor and means for connecting the field-magnet winding of said main and auxiliary motors in parallel.

In testimony whereof, I have hereunto subscribed my name this 22nd day of October, 1920.

BASCUM O. AUSTIN.